United States Patent
Bonzer (12)

(10) Patent No.: US 6,705,360 B1
(45) Date of Patent: Mar. 16, 2004

(54) AIR COMPRESSOR WITH REMOVABLE PROGRAMMABLE AIR GAUGE

(75) Inventor: Robert L. Bonzer, Boise, ID (US)

(73) Assignee: Bon-Aire Industries, Boise, ID (US)

( * ) Notice: Subject to any disclaimer, the term of this patent is extended or adjusted under 35 U.S.C. 154(b) by 0 days.

(21) Appl. No.: 10/458,488

(22) Filed: Jun. 9, 2003

(51) Int. Cl.7 .............................. B65B 1/04; B65B 31/00; B67C 3/00
(52) U.S. Cl. .............................. 141/38; 141/95; 141/192; 141/197; 141/231; 73/146.8; 417/313; 417/411
(58) Field of Search ................................ 141/38–41, 83, 141/94, 95, 192, 197, 231; 73/146.8, 502, 700; 417/234, 313, 411

(56) References Cited

U.S. PATENT DOCUMENTS

| | | |
|---|---|---|
| 4,614,479 A | 9/1986 | Liu |
| 4,830,579 A | 5/1989 | Cheng |
| 5,051,068 A | 9/1991 | Wong |
| 5,104,295 A | 4/1992 | Wong |
| 5,568,117 A | 10/1996 | Hsu |
| 5,891,277 A | 4/1999 | Bachhuber |
| 6,095,762 A | 8/2000 | Wheeler |

*Primary Examiner*—Timothy L. Maust
(74) *Attorney, Agent, or Firm*—Frank J. Dykas; Robert L. Shaver; Stephen M. Nipper

(57) ABSTRACT

An air compressor for use with direct source current sources such as the typical cigarette lighter found in most motor vehicles. The device is made up of an electrically powered air compressor which is controllable by a removable programmable controller. This removable programmable controller is configured to be removable from the compressor to measure an amount of air pressure within an item, and to be programmed and placed upon the compressor to activate the compressor to deliver a desired amount of air to the item being inflated, and to deactivate the compressor when a desired amount of air pressure has been reached within the device.

10 Claims, 3 Drawing Sheets

AIR COMPRESSOR WITH REMOVABLE PROGRAMMABLE AIR GAUGE

BACKGROUND OF THE INVENTION

1. Field of the Invention

The present invention generally relates to air compressors, and more particularly to portable air compressors such as those that are configured to connect with a direct current source of voltage such as an automobile cigarette lighter.

2. Background Information

A variety of devices exist which require the use of compressed air in order to be inflated and useable. These devices include car tires, bicycle tires, float tubes, air mattresses, inflatable rafts and various types of athletic balls such as volleyballs, basketballs, soccer balls, footballs, etc. In addition, a variety of other types of inflatable items and devices exist. These devices and items require that a form of compressed air be forced into them in order to make the items useable. In some instances, a relatively small amount of air pressure is required to fill these items and may be transported into the item by a person simply placing their mouth over an inlet into the device and blowing air into the device. While this method is effective for inflating relatively small items, when a plurality of these items need to be filled or when larger air volumes or pressures are needed, this method is impracticable and in some cases impossible.

When larger volumes or pressures are required to properly inflate a device, another type of device such as a manual pump or a powered air compressor may be required or used. These air compressors or pumps come in a variety of sizes, shapes and embodiments, each specifically configured and adapted to meet the necessities of the prospective users for which the device is configured. Many times large fixed air compressors are located at areas such as gas stations or service stations, to provide air to fill tires. This allows a party with a so-called "low-tire" to be able to fill their tire at the service station while performing other automobile maintaining functions. While placement of these large style air compressors is useful in many applications, there are limitations. For example, when a party has a low or flat tire and is remote from the large fixed air compressor, the fixed air compressor at the service station is of little or no use to them.

The process of filling an item such as an automobile tire from an air compressor typically involves placing an air delivery conduit from the compressor onto the device and activating the air compressor to compress air and deliver air to the item through the air conduit. As the air passes through the conduit into the item being inflated, the item being inflated swells to fill a size defined by the physical limitations of the structure. Once this size has been obtained, the structure is then filled and the air, which continues to enter into the item causes the air pressure within the item to rise. To determine whether or not a desired amount of pressure is present in a designated item, a person may kick a tire, squeeze a ball, or perform other manual tests in order to determine how much air was in the device. However, in some instances, such physical, visible tests are no longer effective. To adequately determine what the pressure in the device is, the air pressure needs to be measured with a gauge.

A typical pressure gauge measures the amount of air pressure within an item by attaching and forming an air-tight connection with an opening in an item such as an air inlet. The air then leaves the item being inflated and enters into a portion of the gauge. The gauge has a measuring device, usually a type of mechanical device which is calibrated so that a certain amount of movement of the mechanical portion translates to a read out of a certain amount of air pressure being displayed on the read out display portion of the pressure gauge. Because most air pressure gauges measure air pressure by measuring an amount of air which escapes from an item being inflated, measuring the air pressure within an item being inflated requires stopping inflation of the device at various intervals in order to measure the pressure within the device being filled.

Obtaining the desired level of inflation also requires that a determination be made as to how much more air needs to be added or removed from the device in order to obtain a desired level of air pressure within a device. This requires a fair amount of guess work concerning how long to place the air conduit in contact with the item to be filled. If too much air is placed within the device then air may need to be relieved from within the item in order to obtain the desired amount of air pressure within the device. If too much air is let out, then additional amounts of air may need to be placed into the device to obtain the desired level of inflation and air pressure within the device. This process can become tedious as the person filling the device attempts to calculate, measure and fill the item all the while attempting to calculate the desired amount of pressure to be placed within the device.

If the air pressure is not checked and modified, the pressure will continue to collect and can overcome the physical limitations of the item being inflated. When this occurs the item being inflated may burst and cause injury to the person filling the device. In addition, over or under pressurization of the device being filled can cause damage to the device as well as to persons or property which may come in to contact with the under or over infla ted d evice. In order to prevent this occurrence, the pressure within a device needs to be monitored by a pressure gauge to ensure that proper tire pressure is achieved and maintained.

Therefore, what is needed is an air compressor with a monitoring gauge that allows a party utilizing the device to monitor the amount of air pressure within an item being filled while the item is being filled. What is also needed is a system that enables a user to determine the air pressure within an item, to select a desired amount of air pressure to be found in the item to be inflated, and to activate an air compressor to compress and deliver an amount of air to the item to reach a desired level of air pressure within the item. What is also needed is a system that when connected to the item to be inflated is able to activate a pump to force an amount of air into the item to be inflated to reach the desired amount of air pressure within the item and to deactivate the pump when the selected air pressure has been reached. What is also needed is a programmable air compressor pump that is configured to be alternatively removed and replaced upon a portable air compressor and which is programmable to interact with the air compressor to start or stop an air compressor. Such a device allows the air pressure to be measured at one location and then taken to an air compressor and programmed to interact with the air compressor to provide a desired amount of air pressure flow and inflation at that location. Embodiments of the present invention fulfill each of these needs.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

The invention is an improved portable air compressor device for use with sources of direct electrical current such as the typical cigarette lighter found in most motor vehicles. The device is made up of an electrically powered air compressor configured to compress air and deliver that air through an air delivery hose to an item to be inflated. In the preferred embodiment, the air compressor is dimensioned and configured to fit within a convenient travel size so as to allow for portable use. Power is supplied from the direct current source through a length of electrical cord which has a socket configured to be inserted within the cigarette adapter of the automobile. The compressor is contained within a housing which has a variety of features. The housing is configured to encase the compressor, to receive a portion of the air delivery hose, to receive a portion of the electrical cord, and to removably, operatively connect with a removable, programmable control gauge. The removable, programmable control gauge is configured to be received within a portion of the case and to be operatively connected and disconnected from the compressor.

The removable, programmable control gauge is configured to disconnect from the housing and be placed upon an item to measure the amount of air pressure within the item. The control gauge is configured to measure and display the amount of air pressure within the item. The control gauge is also configured to be reattached to the housing. The compressor and the control gauge are configured to send air into the item being delivered. While this air is being delivered, the control gauge senses and displays the amount of air pressure that is in the item being inflated. The control gauge is also programmable to select a desired level of air pressure to be obtained within the item being inflated, and to activate the air compressor to deliver air through the air delivery hose to the item to be inflated, to monitor the amount of pressure within the item to be inflated, and to deactivate the compressor when the preselected level of air pressure has been achieved.

This control gauge of the device can therefore be used in three ways. First, the control gauge can be used as a removable air pressure gauge that allows the air pressure of an item to be inflated to be determined from a location distant to the air compressor and to be stored within a memory within the air compressor gauge. The air compressor gauge is also configured to be removably, operatively connected to the air compressor to monitor the air pressure within an item being inflated while the item is being inflated. The air compressor and gauge can also be operatively configured to measure the amount of air pressure within a device and to operatively activate and deactivate the compressor when a desired amount of air pressure has been obtained within the item being inflated.

This device provides an air compressor with the ability to correctly measure and deliver a quantity of air under pressure from an air compressor to an item to be inflated in a manner that prevents over inflation of the item being inflated and allows proper inflation of items being inflated. This device also provides the user with the ability to property inflate a an item from a remote location based upon the direct source current provided in an automobile or other similar device.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
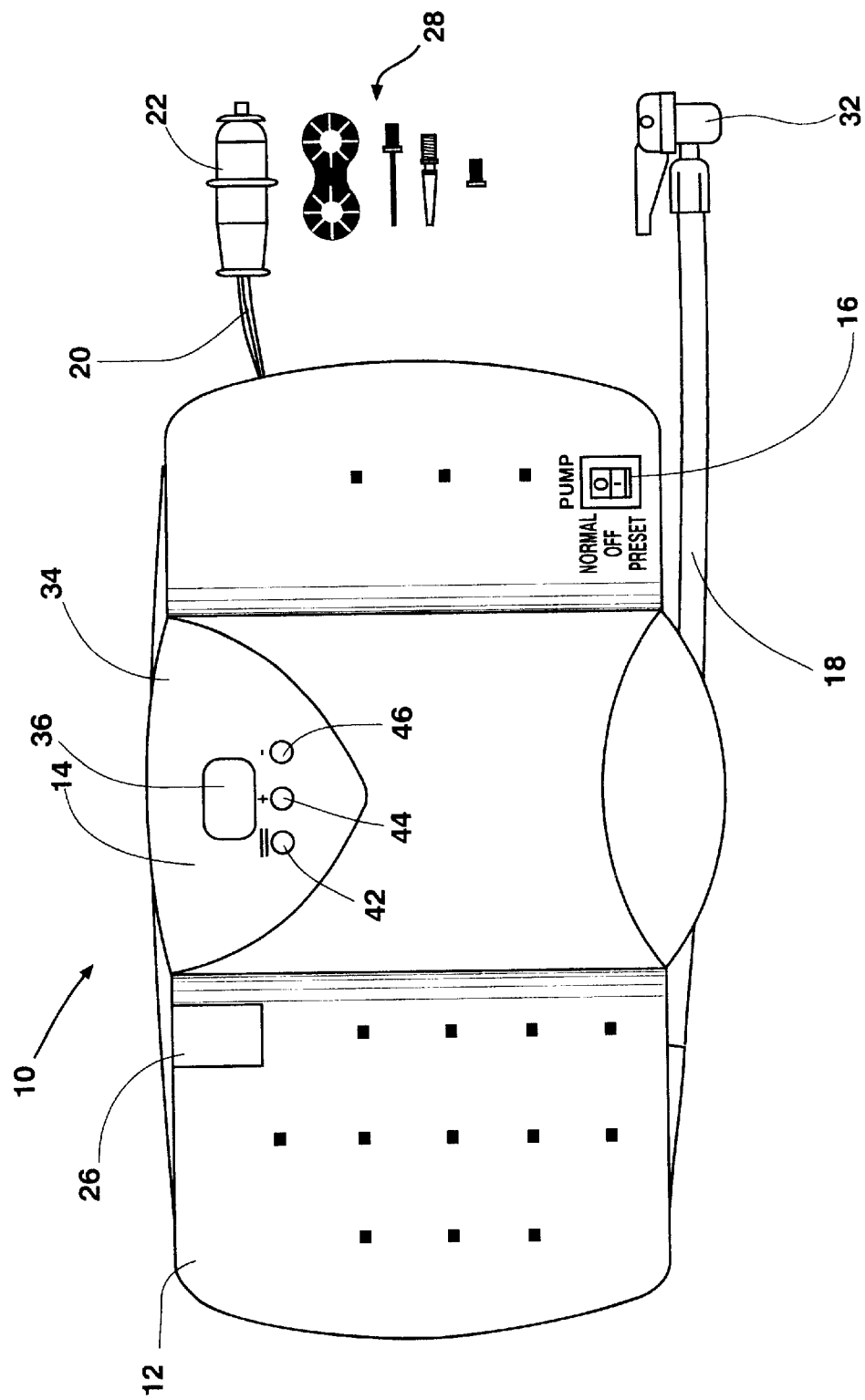
FIG. 1 is a top plan view of the preferred embodiment of the present invention showing the various components extending therefrom.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 2:
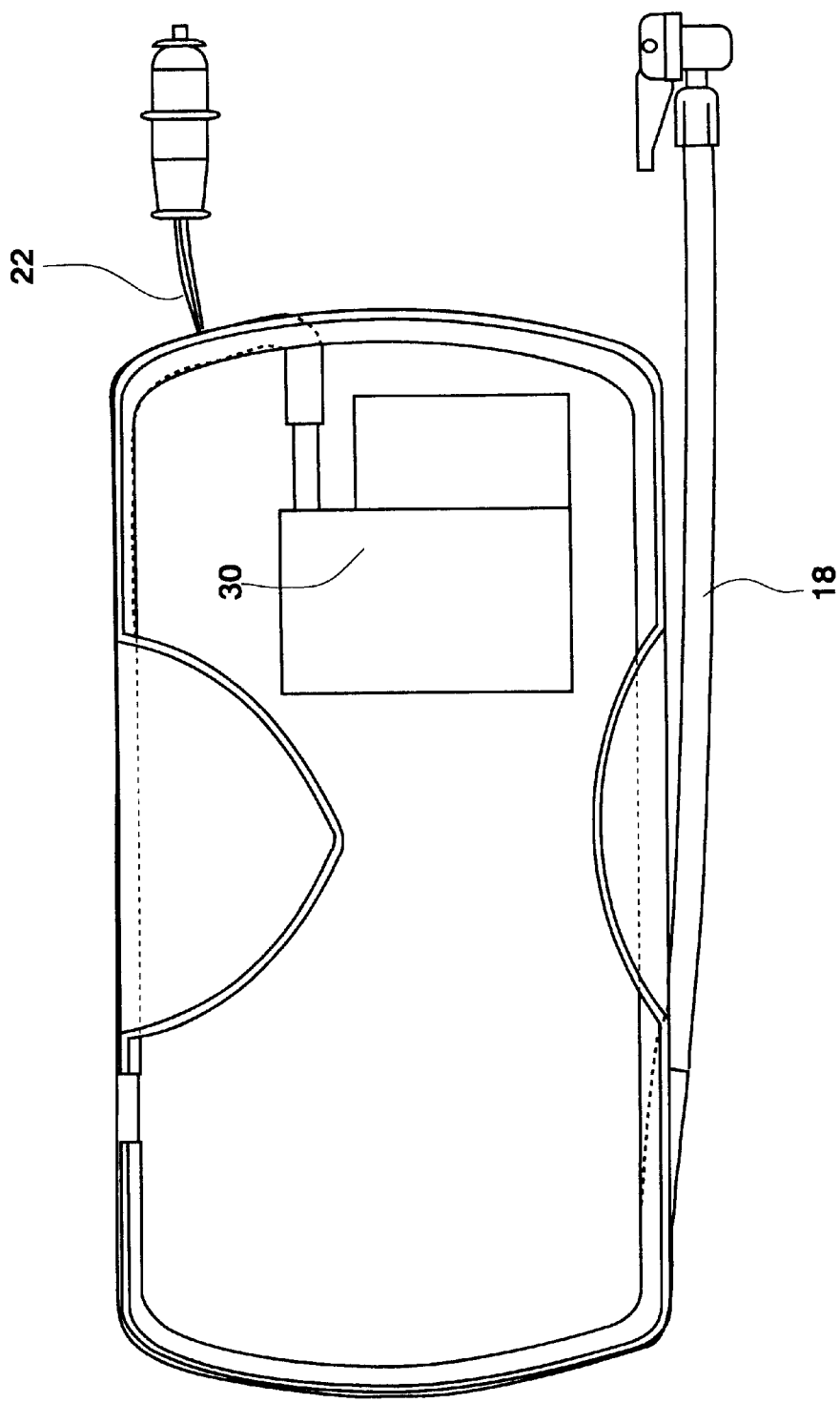
FIG. 2 is a cutaway top plan view of the invention shown in FIG. 1.
Figure 3:
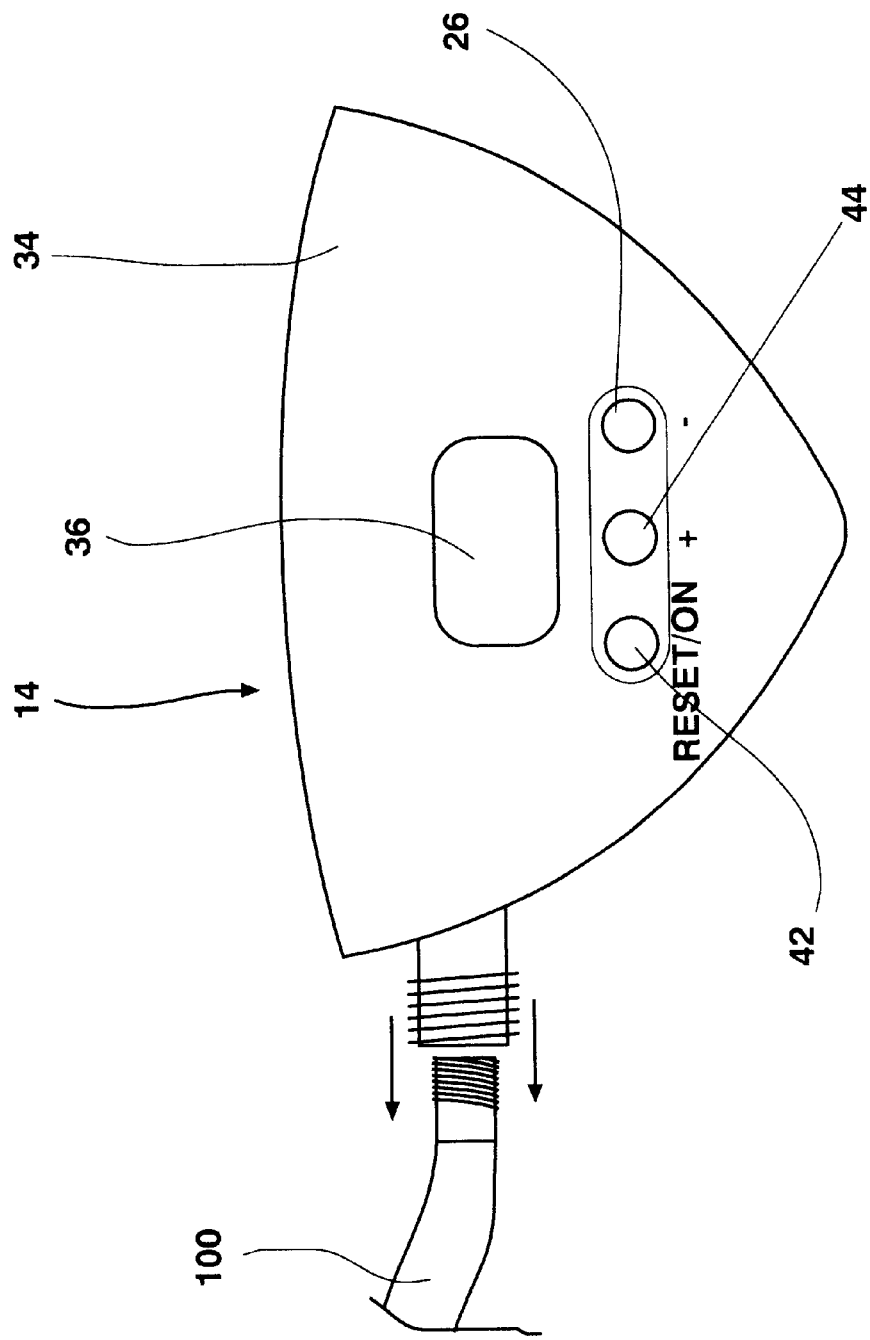
FIG. 3 is a picture of the removable tire pressure gauge in use upon a tire.

FIGS. 1–3 show a preferred embodiment of the present invention. FIG. 1 shows a top plan view of a first embodiment of the invention. The present invention is an air compressor (shown in FIG. 2.) which is configured for connection with a removable programmable pressure gauge 14. For ease of transport and use, the air compressor (shown in FIG. 2) and the pressure gauge are held within a housing 12.

In the preferred embodiment, the air compressor 10 is configured to be powered by a source of direct electric current such as the current emanating from an automobile. Therefore, one of the ways that a device can be used is to inflate automobile tires. The compressor 10 has an electric cord 20 that is connected to a 12-volt plug 22. The plug 22 is the type that is configured to be inserted and attached within an automobile cigarette lighter, such as those found in a typical automobile. The plug 22 is attached to a piece of electrical cord 20 which is configured to extend a designated distance from the housing 12, and to deliver electrical power from the plug 22 to the air compressor motor (shown in FIG. 2). The flow of electricity to the compressor motor shown in FIG. 2 is controlled through the switch 16.

An air delivery conduit 18 transports air from the compressor (shown in FIG. 2) to the item being inflated. The air delivery conduit 18 through which air is passed is typically a hollow hose 18 with a valve tire chuck 32 connected at one end. The hollow hose 18 is typically made of a suitable flexible material that allows the hose to have a desired amount of flexibility while also providing a relatively airtight conduit through which the air may pass. One end of the hose 18 is connected to a valve tire chuck 32. The valve tire chuck 32 is configured to connect with and attach to the valve stem of a tire. The valve tire chuck 32 is configured to depress a portion of a tire valve so as to allow the passage of air through the conduit 18 and into the tire or other item being inflated. The valve tire chuck 32 may also have a clamping portion so as to allow an air tight seal to be formed between the air conducting conduit and the item being inflated. A variety of adaptations 28 are also available for connection with the valve tire chuck 32 which allow the air delivery conduit 18 to be connected to a variety of items to be inflated. These adapters 28 may include a ball adapter, or inflation pin, a mattress inflation adapter, and an adapter for connection with bicycle tires, or other types of adapters.

The switch 16 on the housing 12 is connected to the air compressor motor (shown in FIG. 2) and is configured to have three positions that control the air compressor motor. In the off position, the flow of electricity from a power source to the air compressor motor (shown in FIG. 2) is stopped and the device does not function. In the position marked "normal" the flow of electricity from the source to the motor (shown in FIG. 3) is permitted and the electric motor is activated to deliver air through the delivery conduit to the item to be inflated. In the "preset" position the motor (shown in FIG. 2) is controlled by a microprocessor located within the removable tire pressure gauge 14. The air compressor gauge 14 can be programmed to activate the air compressor (shown in FIG. 2) to deliver air to the item being inflated and to be deactivated to cease delivery of air when this designated amount of air pressure within the item has been achieved.

Referring now to FIG. 2, the air compressor 30 is made up of an electric motor which is configured to connect with a direct current source of electrical power through a switch 16. While in this preferred embodiment the electrical power is a direct current source, it is to be understood that other variations of the present invention which utilize an alternating current source to power an electrical source are also contemplated within this invention. The air compressor 30 is encased within the housing 12, and is operatively connected to an air pump (shown in FIG. 2) which pumps air into the air delivery conduit 18. The air delivery conduit 18 delivers air from the compressor 10 to the item to be inflated. The air compressor 10 is housed within a housing 12 which is configured to be of a convenient size and to have storage locations for a variety of tools and attachments 28 (shown in FIG. 1) which can be alternatively connected to the housing depending upon the necessities of the user.

Referring now to FIG. 1 and FIG. 3, a pressure gauge 14 is configured to be held within a desired position upon the housing 12 in a recess formed within the housing together with a lock 26 which secures the pressure gauge 14 in place in a desired position. The pressure gauge 14 has a pressure sensor, and a programmable microprocessor which are encased within a housing 34 which also contains a display screen 36. As will be discussed later, the pressure gauge 14 may be removed from the housing and used alone simply as a pressure gauge. Additionally, the pressure gauge 14 may be connected to the housing 12 and programmed to control the air compressor 30 (shown in FIG. 2) to achieve a desired amount of air pressure within an item being inflated.

The air pressure gauge 14 is an electronic tire gauge that has the ability to sense an amount of air pressure, to record this amount of air pressure, and to display the amount of air pressure which is sensed. The air pressure gauge 14 in the present invention is a digital air pressure gauge that has a sensor, a microprocessor and a display. All of these items are held within a pressure gauge housing 34. The air pressure gauge 14 is powered by a battery that is held within the housing 34. A sensor is located within the housing and is configured to measure air pressure within an item both while the item is being inflated as well as while the item is not being inflated. The sensor senses air pressure against the sensor and translates this information to the microprocessor which then displays the pressure sensed upon a display 36. In the present embodiment, the display 36 is shown through an LCD display however it is to be understood that the embodiment is not limited thereto.

The display 36 is capable of providing air pressure readouts in psi format, bar, kilograms per square centimeters, and kpa format. The North American standard format is psi and the display is typically defaulted to read in this mode however, the output mode can be changed from psi to a variety of other modes. The display 36 also provides a warning that indicates that the battery needs to be removed and replaced. This batteries may be removed and replaced by removing a small portion of the back cover of the gauge housing 34 and replacing the batteries.

The present invention can be used in a variety of useful ways. First, in the off mode the pressure gauge 14 can be removed and used to measure the air pressure within a tire. The gauge can be removed from the housing by unlocking the gauge 14 from the housing 12, releasing the control gauge latch 26 and lifting the gauge 14 upward from the housing 12 to remove it from its position within the compressor housing 12. The gauge 14 can then be turned on by pressing the reset/on button to turn the gauge 14 on. After about two seconds, the gauge 14 will display a reading of 0.0. The gauge 14 can then be taken to the item to be inflated and the gauge receiving stem portion 38 placed upon a stem or valve 100 of an item to be inflated to measure the air pressure within that item. This use is shown in FIG. 3.

As the pressure gauge 14 is placed upon the device, the air under pressure from within the item will passed into the tire gauge 14. The gauge 14 will sense the amount of pressure according to a sensing device and calculate the air pressure according to a preprogrammed algorithm. This amount of pressure will be displayed on the display screen of the device 36. After fifteen seconds the gauge will automatically shut off. In order to be used again to measure a tire pressure, the reset/on button 40 need only be activated and the gauge 14 placed upon an item to be used.

If so desired, this gauge 14 can then be replaced within its desired position upon the housing of the device and activated to preset an amount of pressure that is desired to be achieved within the device. To operate the compressor 10 using the preset mode, the gauge 14 is placed on the housing 12 and locked in place with the gauge-latching device 26. The plug 22 is connected to a power source and the valve tire chuck 32 is connected to an inlet of an item to be inflated. By pushing the reset/on button 42 on the gauge 14, the gauge 14 will be activated and display the current tire pressure within a certainty of +/−2 psi. The gauge 14 is preset at the factory to activate the air compressor motor 30 to activate and deliver air into the tire or other device being inflated until a pressure of 30 psi is reached. When this desired level is reached the pump will be deactivated automatically. Pressing the +/− buttons 44, 46 will allow a party to alter the desired amount of air pressure to be achieved within an item. In this embodiment, a maximum amount of 100 pressure is as high as a party can select the air pressure to rise to. Pressing the reset button 42, for an extended period of time, about 30 seconds, will return the air pressure shut off level to 30 psi again.

Once the amount of desired air pressure level has been programmed into the gauge 14, the pump switch 16 is moved to the indicated preset position. When this occurs, the gauge 14 will determine the amount of pressure within the tire and activate the compressor pump 30 to increase the amount of air in the tire, and hence the air pressure sensed by the gauge 14. When the preprogrammed amount of air pressure has been reached, the gauge 14 will deactivate the compressor pump 30.

In the present embodiment, the microprocessor is programmed to turn on after 15 second when the pressure is present below 30 psi and the compressor will remain on if the pressure is between 30 and 3 psi.

The compressor 10 can also be utilized without the present function feature. To operate the compressor 10 without utilizing the gauge presetting function, the gauge needs 14 to be placed on the housing 12 and locked in place by the latching device 26. The plug 22 is connected to the current source such as a cigarette lighter in an automobile. The valve tire chuck 32 is connected to the air tire valve of the tire and secures the connection between the air compressor delivery conduit 18 and the item to be inflated. The switch 16 is then placed into the "on" position.

By pressing the reset/on button 42 the gauge 14 will display the current tire pressure +/− 2 psi. By pushing the pump switch 16 into the "normal" position, the compressor 30 will be activated and operate. As the compressor 30 compresses air and delivers the air through the air delivery conduit 18 into the tire, the pressure of the air within the tire or other item being inflated is displayed upon the display 36 and can be visually monitored by a person operating the device. When the air pressure within the tire reaches a desired level, the operator can manually stop the compressor by turning the switch 16 to the off position and prevent further passage of air into the tire. If the operator does not deactivate the pump, the pump will continue to compress and deliver air into the item being inflated.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. An inflation device configured to compress and deliver a quantity of air from an air compressor to an item to be inflated, said inflation device comprised of:
   a compressor pump, said compressor pump configured to be activated by electricity to compress and deliver a quantity of air to an item to be inflated through a delivery conduit;
   said air delivery conduit connected to said compressor, said air delivery conduit configured to deliver air from said compressor to an item to be inflated;
   a length of electrical cord having a plug attached to one end, said plug configured to operatively connect said electrical cord to a power source, said electrical cord configured to conduct electricity from said power source to said compressor pump; and
   a removable programmable control gauge configured to operatively connect and disconnect from said compressor, said removable programmable control gauge configured to disconnect from an operative connection with said compressor pump and to operatively reconnect with said compressor pump, said removable programmable control gauge configured to operatively activate and deactivate said compressor pump based upon preselected criteria.

2. The inflation device of claim 1 wherein said removable programmable control gauge is further configured to monitor the pressure within a device while said device is being filled with air from said compressor pump.

3. The inflation device of claim 1 wherein said compressor pump is additionally configured to be alternatively activated and deactivated by a device other than by said removable programmable control gauge.

4. The inflation device of claim 1 wherein said pump is encased within a housing and said gauge is configured to operatively engaged and disengaged from said housing.

5. The inflation device of claim 4 wherein said housing further comprises a latch for operatively locking said removable programmable control gauge in an operative position within said housing.

6. The inflation device of claim 1 wherein said plug is configured for insertion within and operative connection with an automobile cigarette lighter.

7. The inflation device of claim 1 wherein said removable programmable gauge is configured to function as an independent air pressure measuring device.

8. The inflation device of claim 1 wherein said removable programmable control gauge is configured to be alternatively removably connected with said housing.

9. The inflation device of claim 1 wherein said removable programmable control gauge is configured for cordless removable connection from said housing.

10. An improved portable air compressor comprised of:
    an electrically powered air compressor configured to compress air;
    an air delivery hose connected to said compressor, said air delivery hose configured to deliver air from said compressor to an item to be inflated;
    a length of electrical cord having a socket said socket configured to connect said electrical cord with an electrical source, said electrical cord configured to conduct electricity from a source to said compressor;
    a housing configured to encase said compressor, and a portion of said delivery hose, and to operatively connect with a removable programmable control gauge;
    said removable programmable control gauge configured to be received within a portion of said housing and to be operatively connected and disconnected from said compressor, said removable programmable control gauge configured to be disconnected from said housing and placed upon an item to be inflated, to measure an amount of air pressure within said item to be inflated, to be operatively reconnected to said housing and to said compressor, to be programmable to select a desired level of air pressure to be obtained in an item to be inflated, to activate said compressor to deliver air through said air delivery hose to said item to be inflated, to monitor an amount of pressure within said item to be inflated, and to deactivate said compressor when said pre-selected level of air pressure has been achieved.

* * * * *